Patented Sept. 5, 1950

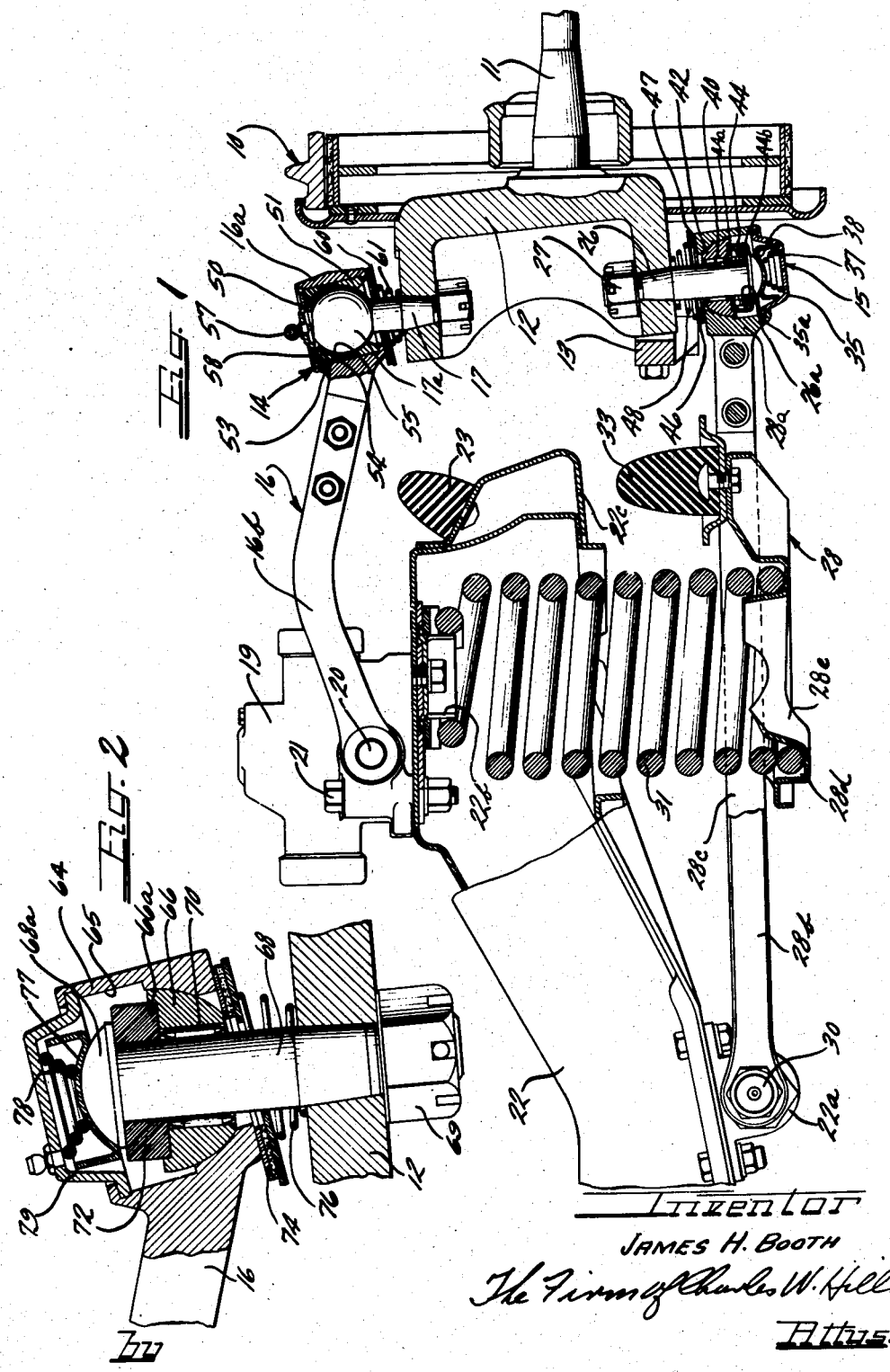

2,521,335

UNITED STATES PATENT OFFICE 2,521,335

FRONT-WHEEL SUSPENSION

James H. Booth, Corunna, Venice Township, Shiawassee County, Mich., assignor to Thompson Products, Inc., Cleveland, Ohio, a corporation of Ohio Application October 24, 1947, Serial No. 781,996

4 Claims. (Cl. 280—96.2)

This invention relates to independent wheel suspension apparatus for automobiles. More particularly, this invention relates to independent wheel suspension apparatus wherein ball joints are used at the outer end of the lower and upper control arms to accommodate knee action and steering movement.

In front wheel suspensions of the type to which this invention relates, the thrust load due to the weight of the vehicle is carried by a lower control arm supported from the vehicle frame through a spring while the shock load due to operation on uneven surfaces or the like is taken care of by the upper control arm acting through a shock absorber. Both of these arms are usually connected through a knuckle support to a steering knuckle pivotally mounted on a pin which permits the wheel to be pivoted about the king pin.

This invention provides an efficient arrangement of ball joints on the ends of the wheel suspension control arms which, in connection with a steering knuckle, afford independent wheel suspension action and easy steering of the front wheels, and eliminates heretofore required knuckle supports, king pins, king pin thrust bearings, and king pin bushings.

The ball joint of this invention located at the outer end of the lower control arm is designed to carry the combined thrust load due to braking and due to the weight of the automobile through a spherical bearing surface to an antifriction bearing. Suspension movement of the wheel is accommodated by the spherical bearing and the radial steering movement is accommodated by the anti-friction bearing.

The ball joint at the outer end of the upper control arm is particularly adapted to dampen vibrations and absorb shock loads by means of a resilient bearing member while permitting pivoting of the control arm in a substantially vertical plane and rotation of the steering member in a horizontal plane.

This novel arrangement of a load carrying ball joint and a shock absorbing ball joint in a wheel suspension device efficiently eliminates shimmy and vibrations in the suspension system and affords easy, controllable steering of the wheels.

In one form of the shock absorbing ball joint, a rubber dampener with a plastic contact surface is used, while in a modified form a bronze wear plate is employed on the thrust surfaces.

It is therefore an object of this invention to provide, in an independent wheel suspension, an efficient arrangement of ball joints for absorbing vibrations and shock loads in the suspension and providing easy steering of the wheels.

Another object of this invention is to provide a bearing which will effectively carry the thrust load transmitted through the lower control arm of an independent wheel suspension and will afford, through an anti-friction member, easy steering characteristics.

A further object of this invention is to provide a bearing which, in cooperation with the upper control arm of an independent wheel suspension, will dampen vibrations in the system and still permit pivoting of the steering member.

Other and further objects of this invention will be apparent to those skilled in the art from the following detailed description of the annexed sheet of drawings, which illustrate one embodiment of the invention.

On the drawings:

Figure 1 is a fragmentary vertical sectional view, partly broken away, of a portion of the front wheel suspension device of this invention.

Figure 2 is an enlarged fragmentary sectional view showing a modified form of the upper ball joint used in a front wheel suspension of this invention.

As shown on the drawings:

In Figure 1, a right front wheel suspension arrangement is illustrated as viewed from the rear of the car. It is believed that the invention will be adequately understood when described in connection with the right side of the front wheel suspension system, although it will, of course, be recognized that the complete system includes an identical suspension device, oppositely disposed, at the left side of the vehicle.

Reference numeral 10 designates the brake drum of a typical road wheel rotatably mounted in the conventional manner on a wheel spindle 11. The spindle 11 is preferably formed integral with a steering knuckle 12 which is supported for swinging, steering movement at its upper and lower ends in ball joints 14 and 15, respectively. Steering movement of the steering knuckle 12 is accomplished through a rearwardly extending steering arm 13 which is controlled from the driver's seat through the conventional tie rod and drag link.

The upper ball joint 14 is arranged to permit swinging of the knuckle 12 and at the same time is adapted to accommodate pivoting in a substantially vertical plane of an upper control arm 16. Control arm 16 includes a box-like housing 16a on its outer end in which the ball end 17a of a stud member 17 is seated, and an inner yoke arm 16b which straddles a shock absorber 19, the arms of the yoke being attached to opposite ends of the rotatably operating shaft 20 of the shock absorber. A plurality of bolts 21 secure the shock absorber to a cross frame member 22 of the vehicle. A resilient member 23 is secured to an outer portion of the frame 22 directly below the upper control arm 16 to limit the downward pivoting movement of the arm. The stud 17 has a tapered shank portion wedged in a hole in the top of the knuckle 12 by means of a nut threaded on the end of the stud.

The lower ball joint 15 is arranged to accommodate the swinging and steering movement of a stud 26 which has a tapered portion wedged in a hole in the bottom of the knuckle 12 by a nut 27 threaded on the end of the stud. The joint 15 also permits pivoting in a substantially vertical plane of a box-like housing end portion 28a of a lower control arm 28. At its inner end the arm 28 has a pair of arms 28b and 28c which straddle a downwardly extending portion 22a of the frame 22 being connected at either end to a pivot pin 30 which extends therethrough. Upper pivoting movement of the control arm 28 is resisted by a coil spring 31 which has its lower end disposed in an annular groove portion 28d of a spring seat 28e attached to the arm 28 and its upper end guided about a downwardly projecting cylindrical portion 22b of the frame 22. A resilient bumper member 33 secured to the spring seat 28e is arranged to contact a projection 22c of the frame 22 to limit upward movement of the arm 28.

As previously mentioned, the lower ball joint 15 must carry the load due to the weight of the automobile and must, at the same time, provide for easy steering of the road wheel. The housing 28a of the joint 15 has an open bottom closed by a cap member 35 which is secured in the housing by peening or spinning a shoulder from the end of the housing under a rim flange 35a of the cap. A spring 37 is disposed between the bottom wall of the closure member 35 and a retainer 38, which has an upper spherical surface arranged to receive the lower spherical end of the stud 26.

Ease of steering is provided by separate sets of anti-friction bearings including a plurality of needle bearings 40 which are disposed around the stud 26 inside a central aperture of a substantially semi-spherical shaped bearing member 42 and a roller or ball bearing assembly 44 which is positioned about the extreme lower end of the stud 26. This assembly 44 includes an upper race 44a disposed in a recess in the lower surface of the semi-spherical member 42 and a lower race 44b abutting a shoulder portion 26a of the lower end of the stud 26. The semi-spherical bearing 42 is adapted to swing or tilt in a mating spherical socket in the box-like end 28a of the lower control arm 28. Thus the anti-friction bearings 40 and 44 permit easy rotation of the stud 26 about its own axis. The roller bearing assembly 44 takes the vertical thrust loads transmitted from the stud 26 through the semi-spherical bearing 42 to the socket 28a and arm 28.

To prevent dirt from entering the ball joint a pair of closure washers 46 with a felt washer 47 therebetween is disposed about the stud 26 over the top opening in the housing 28a through which the stud 26 projects. A coil spring 48 is also disposed about the stud 26 between the top washer member 46 and the steering knuckles 12 to urge the washers 46 into sealing positions.

The upper ball joint 14 of this invention is designed to dampen vibration in the system and to permit pivoting of the steering knuckle 12. This ball joint comprises the outer box-like end portion 16a of the upper control arm 16, which end portion has a central cylindrical cavity 50 in which is arranged the ball end 17a of the integral ball and stud member 17. The lower half of the ball 17a is enclosed by a metal bearing ring 51 which has an outer marginal portion that fits snugly in the cavity 50, and an inner segmental spherical socket portion adapted to receive the ball 17a. The upper end portion of the ball 17a is enclosed by a bearing ring 53 which has an outer member 54 made of resilient material such as rubber and adapted to be positioned in the cavity 50 directly above the lower bearing member 51. The resilient member 54 has an inner spherical socket to which is secured a wear resistant plastic liner or plain bearing member 55, of spherical shape and adapted to receive the top half of the ball 17a. Lubricant is fed into the housing from an oil fitting 57 which is secured to a top closure plate 58 spun into the open top of the housing 16a.

The lower end of the ball joint 14 is sealed against the entry of dirt by a plurality of washers 60 including an intermediate felt washer disposed about the stud 17 and held against the lower end of the joint by a spring 61.

The ball joint 14 thus provides plain bearing surfaces for accommodating tilting and rotating movements of the stud 17. Further, since one of the bearing surfaces is backed by a loaded resilient element 54 the joint will absorb and dampen out vibrations.

In Figure 2, a modification of the upper vibration-absorbing ball joint is illustrated. The box-like end housing 64 of the arm 16 in this embodiment has a central cavity 65, which cavity has a spherical socket portion adapted to receive a substantially semi-spherical bearing member 66. A stud 68 secured by wedging its tapered wall into a hole in the steering knuckle 12 by a nut 69, projects through a central opening in the bearing member 66 being journaled therein on a plurality of needle bearings 70. A substantially circular bronze wear plate 72, having a central aperture, is disposed loosely about the stud 68 fitting in a recess portion 66a on the upper surface of the bearing member 66. An upper collar portion 68a of the stud 68 is arranged to bear down on the upper surface of the bronze wear plate 72. Thus, should the wheel fall into a hole, a sudden shock load will be transmitted from the steering knuckle and the stud 68 through the bronze wear plate 72 and the spherical bearing 66 to the socket 16a and arm 16.

The modified joint shown in Figure 2 is enclosed at its bottom portion against the entry of dirt and dust by a plurality of washer members 74 which are held against the surface by means of a spring 76 disposed between the washers and the steering member 12.

The upper end portion 68a of the stud 68 has a spherical contour fitting into a spherical retainer socket member 77 which is resiliently held in spaced relation from an upper closure plate 79 by means of a coil spring 78.

Thus, this modified ball joint is arranged to permit rotation and tilting of the steering knuckle stud 68. The rotation is borne by anti-friction bearings but the plain thrust bearing provided by the spring loaded bronze wear plate will be effective to continuously dampen out vibrations, and also to absorb the shock load incident to such vibrations. The vibration control is directly influenced by the load of spring 78 and adjustments of spring loads will effect desired dampening characteristics.

From the foregoing description it is seen that this invention provides independent wheel suspension apparatus which does away with many of the standard conventional items such as king pins, knuckle supports, and king pin bearings and affords easy steering characteristics for the steering mechanism and adequate pivoting facilities for the knee action apparatus. The load on this suspension device due to braking action and due to the weight of the vehicle is adequately carried by a lower ball type anti-friction point while shock, braking loads and vibrations in the system are absorbed by loaded plain thrust bearings disposed in the upper ball joint.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In an independent steerable wheel suspension including a pivotally mounted load carrying wheel arm, a pivotally mounted second wheel arm, a wheel knuckle, and ball joints each including a headed stud and an internal bearing wall equipped socket connecting the wheel knuckle and arms to accommodate pivoting suspension action of the arms and rotating steering movement of the knuckle, the improvements of a bearing ring having an external bearing wall tiltable on the bearing wall of the socket for the load carrying arm and accommodating pivoting wheel suspension action and rotatably carrying the stud therein, the head of said stud and ring having opposed suspension load carrying surfaces, anti-friction elements between said surfaces accommodating free relative rotating movements of the stud and ring to facilitate rotating steering movement of the knuckle, said stud and socket of the joint for the second arm being provided with opposed bearing surfaces accommodating pivoting wheel suspension action and rotating steering action of the stud and socket, means defining a plain bearing surface in said socket for the second arm acting on the stud head therein to impart a predetermined resistance to rotating steering action of the knuckle, and means in the socket resiliently urging said plain bearing surface against the stud head to develop a friction force for dampening out vibration tending to rotate the knuckle.

2. In an independent steerable wheel suspension including a pivotally mounted load carrying wheel arm, and a pivotally mounted second wheel arm, a wheel knuckle, and ball joints each including a headed stud and an internal bearing wall equipped socket connecting the wheel knuckle and arms to accommodate pivoting suspension action of the arms and rotating steering movement of the knuckle, the improvements of a bearing ring in each socket having an external bearing wall tiltable on the bearing wall of each socket and accommodating pivoting wheel suspension action and rotatably carrying the headed stud of each joint, each stud head and ring being provided with opposed surfaces, anti-friction elements between said opposed surfaces in the ball joint for the load carrying wheel arm accommodating free relative rotating movements of the stud and ring to facilitate steering rotation of the knuckle, and spring means loading the opposed surfaces in the ball point for the second arm to urge the surfaces together for developing a friction force to dampen out vibration tending to rotate the knuckle.

3. In an independent steerable wheel suspension including a lower load carrying wheel arm, an upper wheel arm, a wheel knuckle, and ball joints each including a headed stud and an internal bearing wall equipped socket connecting the wheel knuckle and arms, said ball joint connecting the load carrying wheel arm and knuckle having the stud thereof in tension under the load on the arm, the improvements of a bearing ring in each socket receiving the stud therethrough and having an external bearing wall tiltable on the bearing wall of the socket for mounting the stud in the socket to accommodate suspension movement of the wheel arms, anti-friction elements between the stud and bearing ring in the lower ball joint for facilitating rotation of the stud in the ring to accommodate free steering rotation of the knuckle, a plain bearing acting on the stud head in the upper ball joint, and means resiliently urging the plain bearing member into engagement with the stud head for creating a friction force to dampen out vibration tending to rotate the knuckle.

4. In a wheel suspension including upper and lower wheel carrying arms, a wheel knuckle, and upper and lower ball joints each including a headed stud and an internal bearing wall equipped socket connecting the wheel knuckle and arms, spring means acting on one of said arms to transfer suspended load thereto, the ball joint connecting the loaded arm with the knuckle having a bearing ring rotatably surrounding the stud and provided with an external bearing wall tiltable on the bearing wall of the socket, anti-friction load carrying elements between the bearing ring and stud facilitating relative rotation therebetween to impart free steering action to the knuckle, the other ball joint having plain bearing surfaces between the stud and socket thereof accommodating suspension action of the arms and steering action of the knuckle, a friction imparting member in the socket of said other ball joint acting on the head of the stud to resist rotation of the stud in the socket, and means resiliently loading said friction imparting member to create a friction force dampening out vibration tending to rotate the knuckle.

JAMES H. BOOTH.

REFERENCES CITED

The following references are of record in the file of this patent:

UNITED STATES PATENTS

| Number | Name | Date |
|---|---|---|
| 2,074,748 | Hufferd et al. | Mar. 23, 1937 |
| 2,085,738 | Coleman | July 6, 1937 |
| 2,153,083 | Griswold | Apr. 4, 1939 |
| 2,167,984 | Leighton | Aug. 1, 1939 |
| 2,216,959 | Paton | Oct. 8, 1940 |
| 2,236,062 | Katcher | Mar. 25, 1941 |
| 2,290,923 | Wahlberg | July 28, 1942 |
| 2,305,795 | Schieferstein | Dec. 22, 1942 |
| 2,330,633 | Seyerle | Sept. 28, 1943 |
| 2,388,950 | Booth | Nov. 13, 1945 |
| 2,398,848 | Newey | Apr. 23, 1946 |
| 2,421,588 | Venditty | June 3, 1947 |
| 2,461,866 | Alldredge | Feb. 15, 1949 |